Patented Dec. 7, 1937

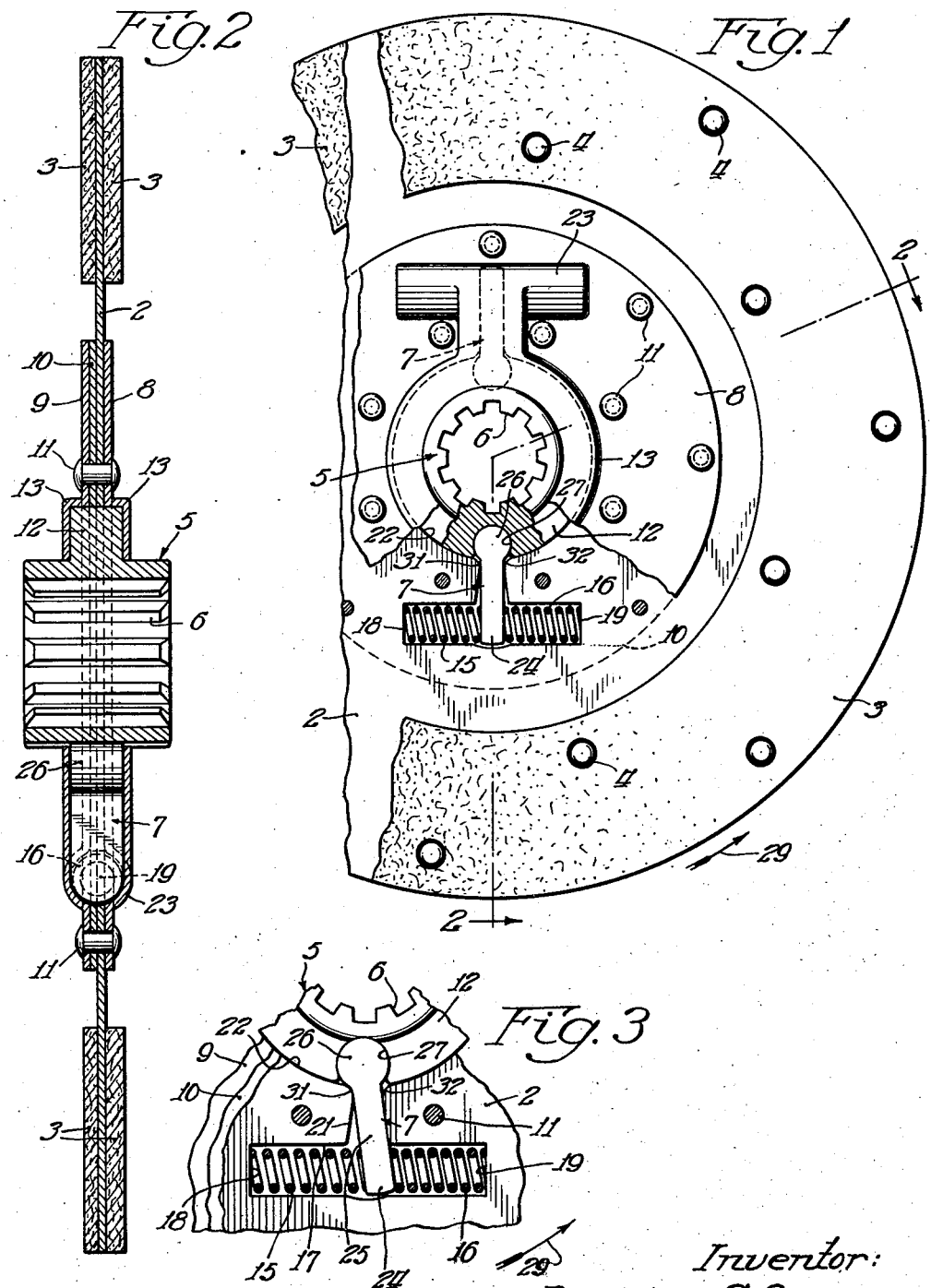

2,101,297

UNITED STATES PATENT OFFICE 2,101,297

FRICTION CLUTCH PLATE

Benjamin A. Swennes, Rockford, Ill., assignor to Borg-Warner Corporation, Chicago, Ill., a corporation of Illinois Application September 12, 1936, Serial No. 100,509

5 Claims. (Cl. 192—68)

This invention relates to improvements in friction clutch plates and more particularly to friction clutch plates for engine clutches having a torsional vibration dampener drive connection between the disk and hub elements thereof, whereby to dampen vibration otherwise transmitted through the plate.

One of the primary objects of my invention is to provide an improved friction clutch plate of the character described, wherein relatively light compression springs are employed in the vibration dampener drive connection but in which the said drive connection is capable of transmitting relatively high torque between disk and hub assemblies.

A further object is to provide an improved friction clutch plate, as described, in which certain of the compression springs of the dampener assembly are arranged directly to oppose certain others of the compression springs, thereby to maintain the dampener driving mechanism normally in equilibrium.

Another object is to provide an improved friction clutch plate as described, wherein the torsional dampener mechanism is entirely encased thereby to preclude misplacement of the parts should they become broken under the stresses to which they are subjected during operation of the plate.

Other objects, the advantages, and uses of the invention will become apparent after reading the following specification and claims, and after consideration of the drawing forming a part of the specification, wherein:

Fig. 1 is a fragmentary end elevation of a friction clutch plate for a motor vehicle clutch incorporating features of my invention;

Fig. 2 is a sectional view along the lines 2—2 of Fig. 1, and

Fig. 3 is an enlarged fragmentary view of a portion of the mechanism illustrated in Fig. 1.

I have selected for illustration herein, a driven friction clutch plate of the type intended for use in the engine clutch of a motor vehicle and which may comprise in general, a stamped metal disk 2 having friction facings 3 fixed upon its peripheral portion, one on either side of the disk, as by means of rivets 4, a hub member 5 internally splined, as indicated at 6, for disposition of the hub upon the splined transmission drive shaft of the motor vehicle, and a torsional dampener mechanism, generally indicated at 7, forming a yieldable drive connection between the disk 2 and hub 5.

With reference to Figs. 1 and 2, it will be noted that the disk 2 is provided at its inner portion with a pair of annular plates 8 and 9 fixed upon opposite sides respectively thereof, by means of rivets 11 which extend through the plates and the intervening portion of the disk 2. A filler plate 10 is preferably interposed between the disk 2 and plate 9. The plates 8 and 9 extend beyond the inner portion of the disk and filler plate and embrace a flange 12 formed integrally with the hub member 5 and extending radially from the outer wall thereof. I prefer to form the flange 12 of a thickness substantially equal to the depth of the torsional dampening assembly 7, and to laterally offset portions of the plates 8 and 9, as shown at 13, at their inner portions in order that they may have proper overlapping engagement with the side walls of the flange 12, as shown.

With the mechanism thus far described, the disk assembly 2 including the facings 3 and side plates 9 and 8, is free to oscillate as a unit relative to the hub 5.

In Fig. 3 I have illustrated in detail the torsional dampener mechanism 7. This mechanism 7 may comprise a pair of axially aligned compression springs 15 and 16, located one at each end of an opening 17 through the superimposed disk 2 and filler plate 10, the end walls 18 and 19 of the opening providing spring seats against which the remote ends of the springs may bear, as shown. The opening 17 is preferably T-shaped in contour with the portion 21 thereof extending perpendicularly therefrom to the inner edges 22 of the disk 2 and plate 10. The springs 15 and 16 may be of a diameter substantially equal to the thickness of the flange 12 and may be held against displacement by inclosure within the confines of embossed portions 23 formed in the side plates 8 and 9 to conform in contour with the springs and to follow in general the contour of the T-shaped opening 17, see Fig. 1.

Interposed between the adjacent ends of the compression springs 15 and 16 is the outer end 24 of a lever 25, the opposite end of which may be cylindrical in form, as shown at 26, and received in a cylindrical recess 27 formed transversely across the flange 12. The thickness of the lever 25 may be approximately the thickness of the flange 12, as indicated in Fig. 2, and as in the case of the springs 15 and 16 the lever may be retained against displacement by confinement within the registering embossed portions 23 of the side plates 8 and 9.

In the drawing I have shown two torsional dampener assemblies 7 diametrically opposed to one another, on opposite sides of the hub 5

It will be apparent of course, that more than two such dampener assemblies may be used depending upon the torque requirements for which the clutch plate is designed.

In operation, torque applied to the plate from a clutch drive assembly, as by frictional engagement of the drive assembly with the friction facings 3 will cause the hub 5 to be driven through the spring and lever assemblies described, one of the springs 15 or 16 yielding upon pivotal movement of the lever depending upon the direction of the drive. Assuming the disk 2 to be driven in the direction of the arrow 29 in Fig. 3, the transmission of torque from the disk assembly to the hub assembly may be through the contacting portions of the disk 2 and filler plate 10 with the lever 25, as indicated at 31, such contacting portions comprising a part of the side wall of the portion 21 of the slot 17 and an intermediate portion of the lever adjacent to the cylindrical portion 26 thereof.

It is thus apparent that the drive between the disk and the hub is accomplished through the lever 25 but since the lever 25 is pivotally mounted upon the hub flange 12 with its outer end, or longer arm, engageable with the springs 15 and 16, pivotal movement of the lever will be resisted by the spring in proportion to the torque load transmitted from disk to hub. Where the torque load is very high the lever may assume the position indicated in Fig. 3 thus to establish a positive drive between disk and hub. This is due to the fact that the lever 25 while in the position shown in Fig. 3 has moved to the limit of its travel in one direction relative to the disk and its mid-portion is in abutting contact with the disk 2 and filler plate 10. Contact between the portion 32 and the mid-portion of the lever 25 is established during the transmission of torque from the disk assembly to the hub assembly when the disk is rotating in a direction opposite to the arrow 29. In either event however, the drive will be through the lever 25 resisted by the compression of the spring 15 or 16, and always depending upon the direction of relative rotation between the disk 2 and hub 5.

A clutch plate constructed, as described herein, possesses the advantage of relatively high torque transmitting characteristics without necessitating the use of heavy compression springs. This feature of the disk is attributable to the force multiplying characteristics of the levers 25 which under normal conditions and loads retain approximately the position indicated in Fig. 1, both springs 15 and 16 being effective to absorb and dampen vibration otherwise transmitted through the disk and hub assemblies.

I claim as my invention:

1. A friction clutch plate comprising, a hub member, a disk member mounted for oscillation upon said hub member, friction facings on said disk member adapted frictionally to be engaged and driven by a clutch driving assembly, and means providing a resilient drive connection between said disk and hub members, said means including a simple lever pivotally mounted on said hub member and extending beyond the periphery of the hub member, a pair of compression springs each bearing at one end upon a portion of said disk member and having their opposite ends acting upon the outer end of said lever whereby yieldingly to resist pivotal movement of the lever in either direction, and means forming a part of said disk member adapted to engage said lever between its fulcrum and the point of engagement between said springs and said lever.

2. A friction clutch plate, as defined in claim 1, including means positively to limit the pivotal movement of said lever.

3. A friction clutch plate, as defined in claim 1, wherein a plurality of said levers and said springs are employed and wherein said levers and springs are arranged in annular array circumferentially about the overlapping portions of the hub and disk members.

4. A friction clutch plate comprising, a hub member having a radial flange on the outer wall thereof, a stamped metal disk mounted concentrically about said hub flange, a plurality of levers pivotally mounted upon said hub flange and extending radially outward beyond the periphery thereof, a plurality of compression springs each having one end acting against a portion of said disk and the opposite end acting against the outer end of said levers respectively, and means on said disk engageable with said levers at a point between the pivotal axes thereof and the points of engagement with said springs.

5. A friction clutch plate comprising, a hub member having a radial flange on the outer wall thereof, a disk mounted concentrically about said hub flange, friction facings carried on the peripheral portion of said disk and adapted frictionally to be engaged by a clutch driving assembly, said disk having portions cut away on the inner edge thereof, levers pivotally mounted upon said hub flange and extending into said cut away portions of said disk, a plurality of pairs of compression springs interposed between said disk and the outer ends of said levers, the springs of each pair being arranged in such manner as to oppose one another, and means carried by the disk engaging with each of said levers upon opposite sides thereof and intermediate the pivotal axes of the levers and their points of engagement by said springs.

BENJAMIN A. SWENNES.